United States Patent [19]

Asanuma et al.

[11] Patent Number: 5,157,092
[45] Date of Patent: Oct. 20, 1992

[54] POLYMER OF 4-METHYLPENTENE-1

[75] Inventors: Tadashi Asanuma, Osaka;
Tetsunosuke Shiomura, Tokyo;
Nobutaka Uchikawa, Osaka; Yukari
Tamai, Osaka; Tateyo Sasaki, Osaka;
Tutomu Iwatani, Osaka, all of Japan

[73] Assignee: Mitsui Toatsu Chemicals, Incorporated, Tokyo, Japan

[21] Appl. No.: 535,535

[22] Filed: Jun. 11, 1990

[30] Foreign Application Priority Data

Jun. 21, 1989 [JP] Japan .................. 1-156706
Oct. 26, 1989 [JP] Japan .................. 1-277246
May 25, 1990 [JP] Japan .................. 2-134041

[51] Int. Cl.⁵ ......................................... C08F 10/14
[52] U.S. Cl. .............................. 526/348.4; 526/114; 526/160; 526/348.2; 526/902
[58] Field of Search ............. 526/160, 348.4, 114, 526/348.2

[56] References Cited

U.S. PATENT DOCUMENTS 4,791,180 12/1988 Turner et al. .................. 526/160
4,892,851 1/1990 Ewen et al. .................. 526/160 X

FOREIGN PATENT DOCUMENTS 0351392 1/1990 European Pat. Off. .

OTHER PUBLICATIONS

Synthesis of Syndiotactic poly-1,2-(4-methyl-1,3-pentadiene), Zambelli et al, Macromolecules, 22(5), 2126, 1989.
Journal of The American Chemical Society, vol. 110, 1988, pp. 6255-6256, American Chemical Society; J. A. Ewen et al.

Primary Examiner—Joseph L. Schofer
Attorney, Agent, or Firm—Burns, Doane, Swecker & Mathis

[57] ABSTRACT

A polymer of 4-methylpentene-1 having a substantially syndiotactic structure, which polymer contains 0 to 30 mol % of the α-olefin unit other than the 4-methylpentene-1 unit and has excellent physical properties.

7 Claims, 4 Drawing Sheets

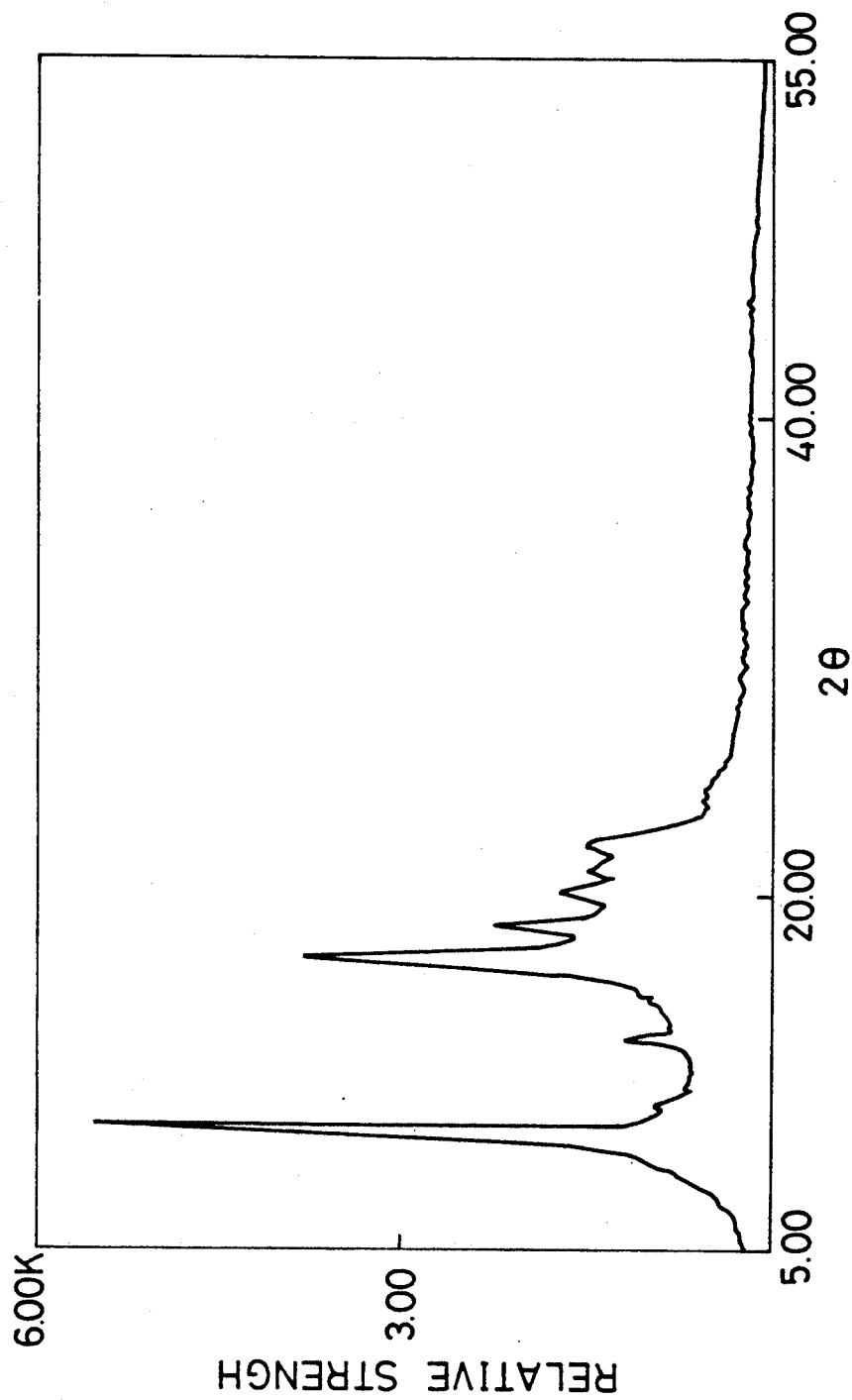

POLYMER OF 4-METHYLPENTENE-1

BACKGROUND OF THE INVENTION

(1) Field of the Invention

The present invention relates to a polymer of 4-methylpentene-1 having a substantially syndiotactic structure and high tacticity.

(2) Description of the Prior Art

Polymers of α-olefin having a syndiotactic structure have been known for a long period of time, and one of them is syndiotactic polypropylene. However, the syndiotactic polypropylene, which can be obtained by a method for polymerizing propylene at a low temperature in the presence of a catalyst comprising a vanadium compound, an ether and an organic aluminum compound, is poor in syndiotacticity. For this reason, such a kind of polypropylene is not considered to have the characteristics of syndiotactic polypropylene.

J. A. Ewen et al. have found for the first time that when propylene is polymerized by the use of a polymerization catalyst comprising a transition metal (Hf or Zr) compound having an asymmetric ligand and methyl aluminoxane, a propylene having such a good tacticity that a syndiotactic pentad fraction measured by $^{13}$C-NMR in excess of 0.7 can be obtained [J. Amer. Chem. Soc., 110, 6255-6256 (1988)].

In the J. A. Ewen et al. method, the activity of each transition metal is high, and the syndiotactic polypropylene obtained by this method has high syndiotacticity and excellent physical properties. However, J. A. Ewen et al. do not disclose the polymerization of 4-methylpentene-1 at all.

It is known that some of the polymers of 4-methylpentene-1 are isotactic or atactic, and the polymers of 4-methylpentene-1 having the syndiotactic structure have also been reported by A. Zambelli et al. [Macromolecules, 22, 2126-2128 (1989)]. The A. Zambelli et al. method comprises hydrogenating a 1,2-polymer of 4-methyl-1,3-pentadiene having the syndiotactic structure in order to prepare the polymer of 4-methylpentene-1 having the syndiotactic structure.

However, the tacticity of the 1,2-polymer is not high, and thus the polymer of 4-methylpentene-1 which is the hydrogenated compound thereof is also poor in tacticity, with the result that the polymer of 4-methylpentene-1 has low crystallizability. I addition, the A. Zambelli et al. method has the drawback that a copolymer of 4-methylpentene-1 and another α-olefin cannot be prepared by this method.

SUMMARY OF THE INVENTION

An object of the present invention is to provide a polymer and a copolymer of 4-methylpentene-1 having high tacticity.

Another object of the present invention is to provide a substantially syndiotactic copolymer of 4-methylpentene-1 and another α-olefin which copolymer is excellent in physical properties, particularly impact resistance, and also has good balance between impact resistance and stiffness and good transparency.

According to the present invention, there is provided a polymer of 4-methylpentene-1 having a substantially syndiotactic structure which polymer contains 0 to 30 mol% of an α-olefin unit other than 4-methylpentene-1.

In the homopolymer of 4-methylpentene-1 which is the above-mentioned polymer, a peak intensity observed at about 43.1 ppm on the basis of tetramethylsilane in a spectrum of $^{13}$C-NMR measured as a 1,2,4-trichlorobenzene solution is at least 0.5 of the total of peak intensities observed at about 42-44 ppm; the molecular weight measured by gel permeation chromatography is 1,000 or more; and a maximum diffraction line is observed in a spacing of about 9 Å by X-ray diffraction.

Moreover, in a copolymer of 4-methylpentene-1 and another α-olefin which is the above-mentioned polymer, a peak intensity of a 4-methylpentene-1 unit observed at about 43.1 ppm on the basis of tetramethylsilane in a spectrum of $^{13}$C-NMR measured as a 1,2,4-trichlorobenzene solution is at least 0.3 of the total of peak intensities of the 4-methylpentene-1 unit observed at about 42-44 ppm; the α-olefin unit is present in an amount of from 0.1 to 30 mol%; and an intrinsic viscosity measured at 135° C. as a tetralin solution is at least 0.05.

BRIEF DESCRIPTION OF THE DRAWINGS

FIG. 3 is an infrared absorption spectrum of isotactic poly(4-methylpentene-21) obtained in Example 1 and FIG. 4 is a X-ray diffraction spectrum of syndiotactic poly(4-methylpentene-1) obtained in Example 1.

DESCRIPTION OF THE PREFERRED EMBODIMENTS

Figure 1:
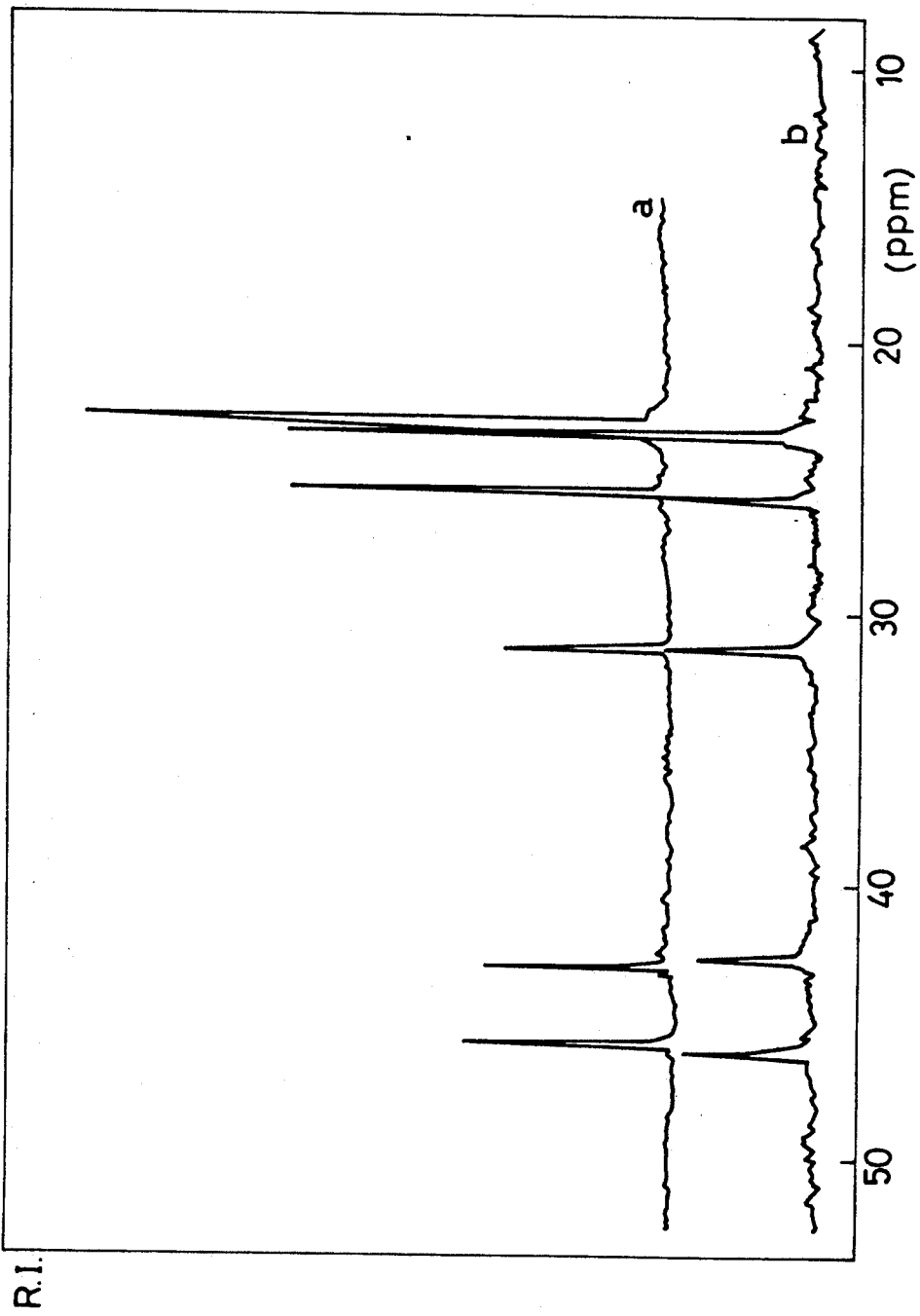
FIG. 1 is a peak spectrum of $^{13}$C-NMR of poly(4-methylpentene-1) obtained in Example 1 [curve a is concerned with syndiotactic poly(4-methylpentene-1), and curve b is concerned with isotactic poly(4-methylpentene-1)]

A polymer and a copolymer of 4-methylpentene-1 according to the present invention can be obtained by polymerizing 4-methylpentene-1 alone or in combination with another α-olefin in the presence of a catalyst. Examples of the polymerization catalyst include compounds recited in the J. A. Ewen et al. literature and other compounds for providing homopolymers of propylene in which tacticity is relatively high, i.e., a syndiotactic pentad fraction obtained from the spectrum of $^{13}$C-NMR is at least 0.7. For example, a catalyst comprising a compound of a transition metal having an asymmetric ligand and an aluminoxane is effective.

Examples of the transition metal compound having the asymmetric ligand include isopropyl(cyclopentadienyl-1-fluorenyl)hafnium dichloride, isopropyl(cyclopentadienyl-1-fluorenyl)zirconium dichloride and other similar compounds in which one or two chlorine atoms are replaced with other halogen atoms or alkyl groups having 1 to 5 carbon atoms.

Examples of the aluminoxane include compounds represented by the formulae

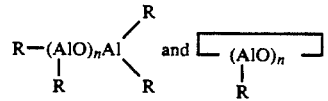

wherein R is a hydrocarbon residue having 1 to 3 carbon atoms, preferably a methyl group, and n is a value of at least 5, preferably a value of from 10 to 100.

The molar ratio of the aluminoxane to the transition metal compound is from 10 to 1,000,000, preferably from 50 to 5,000.

The polymerization conditions are not subject to any particular restriction, and there can be used a solvent polymerization process using a known inert solvent, a mass polymerization process in a substantially inert solvent-free system or a gaseous phase polymerization process. In general, the polymerization temperature is in the range of from $-100°$ to $200°$ C., and the polymerization pressure is in the range of from atmospheric pressure to $100$ kg/cm$^2$—G. The polymerization at a temperature of from $-100$ to $100°$ C under a pressure of from atmospheric pressure to $50$ kg/cm2-G is particularly preferred.

In the present invention, the homopolymer of 4-methylpentene-1 can be prepared by effecting the polymerization at a relatively low temperature in the presence of the above-mentioned catalyst. If necessary, the resulting polymer is then washed with a saturated hydrocarbon compound having about 5 to about 20 carbon atoms such as pentane, hexane or heptane, an aromatic hydrocarbon compound such as benzene, toluene, xylene or ethylbenzene, a compound thereof in which a part or all of hydrogen atoms are replaced with halogen atoms, an alcohol having 1 to 20 carbon atoms, or an ether or an ester having 2 to 20 carbon atoms, in order to remove polymers of 4-methylpentene-1 having relatively low tacticity, whereby the homopolymer of 4-methylpentene-1 having high tacticity is obtained.

In the thus obtained 4-methylpentene-1 polymer, the peak intensity observed at about 43.1 ppm on the basis of tetramethylsilane in a spectrum of $^{13}$C-NMR measured as a 1,2,4-trichlorobenzene solution is at least 0.5 of the total of absorption intensities observed at about 42–44 ppm.

The crystallization temperature of the polymer which is measured by melting the same at $300°$ C. and then lowering its temperature at $10°$ C./minute is $160°$ C. or more.

Furthermore, the 4-methylpentene-1 polymer of the present invention is also characterized in that a maximum diffraction line appears in a spacing of about 9 Å in an X-ray diffraction spectrum.

The molecular weight of the 4-methylpentene-1 homopolymer according to the present invention is preferably 1,000 or more, particularly preferably 5,000 or more in terms of a weight average molecular weight measured by gel permeation chromatography, because this homopolymer will be molded later on. The above-mentioned molecular weight can be obtained by, for example, measuring a molecular weight of the polymer as a 1,2,4-trichlorobenzene solution at $135°$ C., and calculated as a polypropylene. A ratio (Mw/Mn) of the weight average molecular weight (Mw) to the number average molecular weight (Mn) of the polymer is preferably from 1.5 to 20. Although the polymer having a relatively narrow molecular weight distribution (Mw/Mn is 3 or less) is usually formed by using the above catalyst system, the polymer having a broad molecular weight distribution can be produced by the use of a catalyst system formed by mixing a Hf containing catalyst with a Zr containing catalyst.

In the copolymer of 4-methylpentene-1 according to the present invention, examples of the $\alpha$-olefin which will be subjected to the copolymerization with 4-methylpentene-1 are $\alpha$-olefins having 2 to 25 carbon atoms except for 4-methylpentene-1. Typical examples of the $\alpha$-olefins include ethylene, straight-chain $\alpha$-olefins of $H_2C=CH\text{-}13\,(CH_2)_nCH_3$ (wherein n is an integer of 0 to 22) such as propylene, butene-1, pentene-1, octene-1, nonene-1, decene-1, undecene-1, dodecene-1, tridecene-1, pentadecene-1, hexadecene-1, heptadecene-1, octadecene-1, eicosene-1 and pentacosene-1, and branched $\alpha$-olefins having an alkyl group in which a $-(CH_2)_nCH_3$ group is branched, such as 3-methylbutene-1 and 4,4-dimethylpentene-1. These $\alpha$-olefins can be used singly or in combination. The units of these $\alpha$-olefin are contained in an amount of 0.1 to 30 mol%, preferably 0.2 to 25 mol%, more preferably 0.3 to 20 mol% of the total units in the copolymer. When the $\alpha$-olefin units are in excess of 30 mol%, stiffness undesirably deteriorates. When the $\alpha$-olefin is propylene it is contained in an amount of 0.1 to 20 wt. %.

The polymerization is carried out under the conditions whereby the content of the $\alpha$-olefin monomer other than 4-methylpentene-1 in a polymerization system is in the above-mentioned range and whereby the monomer ratio and polymerization temperature are in the above-mentioned ranges in order that an absorption intensity of the 4-methylpentene-1 unit observed at about 43.1 ppm on the basis of tetramethylsilane in a spectrum of $^{13}$C-NMR measured as a 1,2,4-trichlorobenzene solution of the obtained copolymer may be at least 0.3 of the total of the absorption intensities of the 4-methylpentene-1 unit observed at about 42–44 ppm.

When the copolymer is washed as in the case of the homopolymer of 4-methylpentene-1, tacticity of the copolymer can be improved.

The pattern of the absorption spectrum of a methylene group which is considered to be attributable to the steric structure of the polymer of 4-methylpentene-1 is not known so far, and the copolymer having the physical properties which conventional polymers cannot possess would be characterized by this methylene group.

In the present invention, no particular restriction is put on the molecular weight of the copolymer, as long as the latter can be utilized as the usual polymer. Since this copolymer will be used as molding resins, however, the molecular weight is 0.05 or more in terms of an intrinsic viscosity measured as a tetralin solution at $135°$ C., or about 1,000 or more, preferably 5,000 or more in terms of a propylene-converted number average molecular weight (Mn) measured by gel permeation chromatography. Furthermore, the ratio (Mw/Mn) of the weight average molecular weight to the number average molecular weight of the copolymer is preferably from 1.5 to 20.

The molded article of the homopolymer of 4-methylpentene-1 according to the present invention is relatively brittle and therefore its physical properties cannot be evaluated under usual measurement conditions for physical properties, which means that it is difficult to apply the molded article to a typical uses. Needless to say, however, this polymer can be blended with another polymer and then molded.

On the other hand, the molded article of the copolymer of 4-methylpentene-1 and another $\alpha$-olefin according to the present invention is excellent in impact resistance and balance between impact resistance and stiffness.

Now, the present invention will be described in detail in reference to examples, but these examples intend to eluciate the present invention without any limitation.

EXAMPLE 1

In a 300-ml flask, 5 mg of isopropyl(cyclopentadienyl-1-fluorenyl) zirconium dichloride and 0.34 g of methylaluminoxane having a polymerization degree of about 15 were mixed with 100 g of 4-methylpentene-1, the aforesaid isopropyl(cyclopentadienyl-1-fluorenyl)-zirconium dichloride being prepared by introducing lithium into isopropylcyclopentadienyl-1-fluorene synthesized by a conventional process and then reacting the resulting compound with zirconium tetrachloride, the aforesaid methylaluminoxane being prepared by reacting copper sulfate hexahydrate with trimethylaluminum in toluene. Afterward, the mixture was subjected to polymerization at 25° C. for 5 hours. The polymerization mixture was then poured into a large amount of methanol, so that 5.7 g of poly(4-methylpentene-1) was obtained as a methanolinsoluble product.

The number average molecular weight (Mn) and the weight average molecular weight (Mw), which were measured at 135° C. by a gel permeation chromatograph (trade name GPC150C; made by Waters Ltd.) and then converted into a polypropylene base, were 35,400 and 64,300, respectively. In a spectrum of $^{13}$C-NMR on the basis of tetramethylsilane obtained by measuring a 1,2,4-trichlorobenzene solution of the polymer, five peaks were observed at 23.4, 25.9, 31.6, 43.1 and 46.0 ppm. Furthermore, the melting point and the crystallization temperature of the polymer were measured by temperature rise and temperature drop at 10° C./minute by means of a differential scanning calorimeter. As a result, the melting point was 205.5° C. and the crystallization temperature was 169.2° C.

On the other hand, 4-methylpentene-1 was polymerized in the presence of a 1,2-ethylenebisindenylzirconium dichloride catalyst in order to obtain isotactic poly(4-methylpentene-1). For this product, the absorption spectrum of $^{13}$C-NMR was measured, and peaks were observed at about 23.5, 25.9, 31.4, 42.6 and 46.0 ppm on the spectrum. Furthermore, the melting point and the crystallization temperature of the polymer were 227.5° C. and 207.8° C., respectively.

Figure 2:
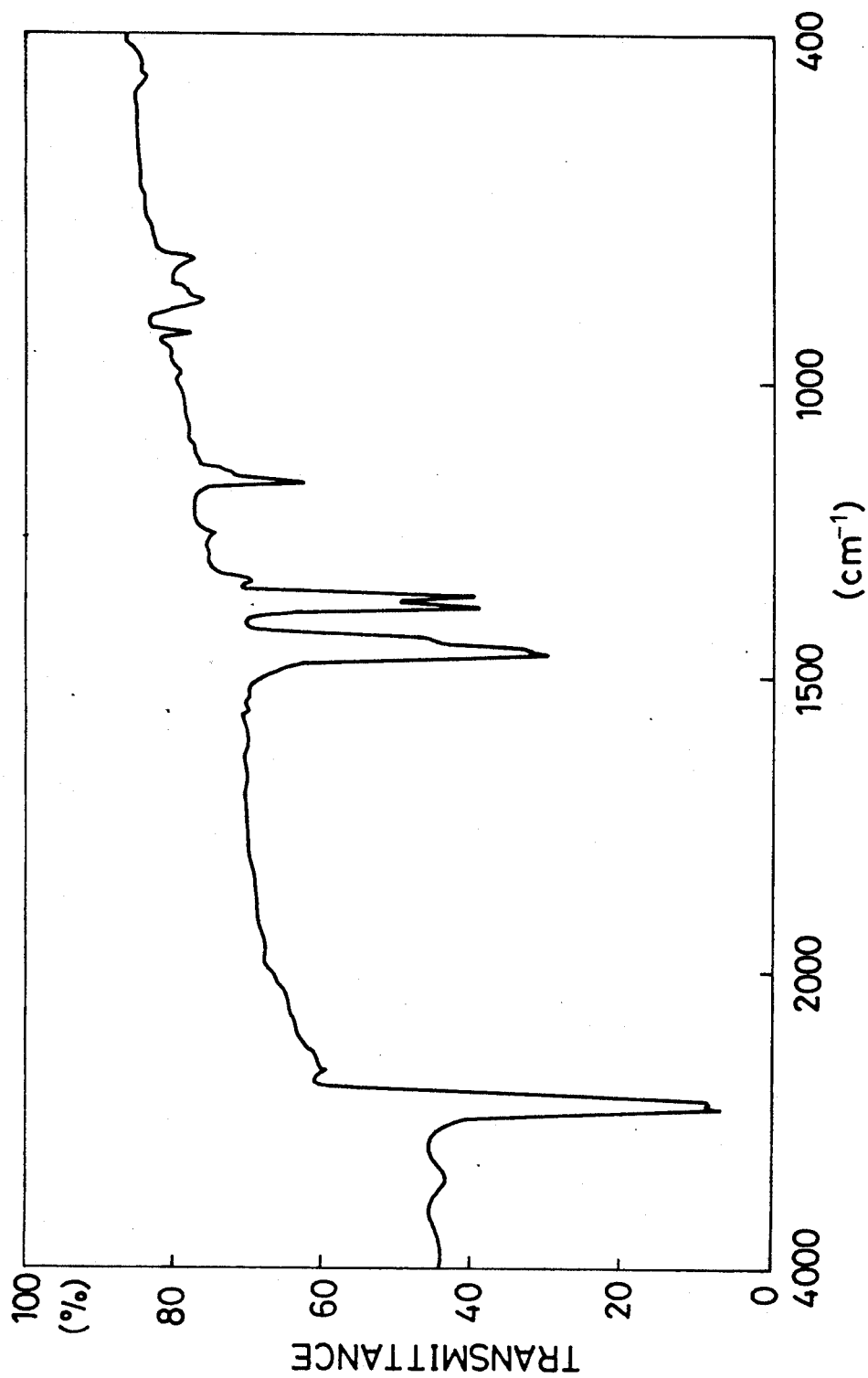
FIG. 2 is an infrared absorption spectrum of syndiotactic poly(4-methylpentene-1) obtained in Example 1.
Figure 3:
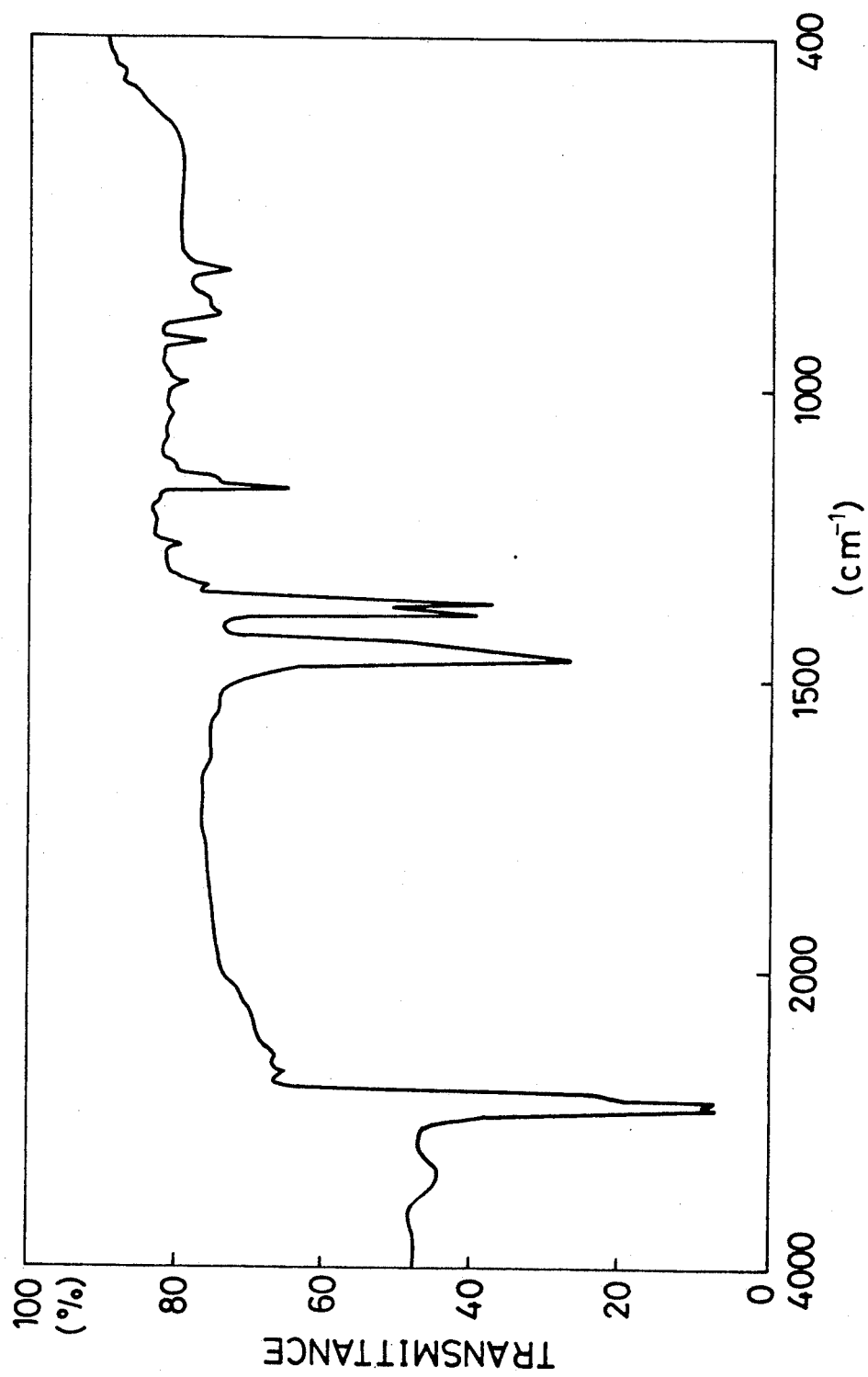

In the polymer according to the invention, the intensity of the peak attributed to the syndiotactic pentad bond at 43.1 ppm of the peak attributed to CH$_2$ groups of the main chain was 0.81 with respect to the peak attributed to CH$_2$ groups of the main chain at 43.1 ppm and the peak attributed to the CH$_2$ groups directly bonded to the main chain of the CH$_2$ groups on all the side chains. The measurement results of a spectrum by $^{13}$C-NMR are set forth in FIG. 1, and the measurement results of an infrared absorption spectrum are set forth in FIGS. 2 and 3. In addition, the results of X-ray diffraction spectrum measured by using Cu-Kα ray are shown in FIG. 4.

EXAMPLE 2

In a 300-ml autoclave, 5 mg of isopropyl(cyclopentadienyl-1-fluorenyl) zirconium dichloride obtained by the same procedure as in Example 1 and 0.67 g of methylaluminoxane having a polymerization degree of about 16 (made by TOSO AKUZO Corp.) were dissolved in 400 ml of 4-methylpentene-1. Furthermore, 10 g of propylene was added thereto at 30° C., and polymerization was then carried out with stirring at 30° C. for 2 hours. Afterward, unreacted propylene was purged, and a large amount of methanol was then added thereto, followed by filtration and drying at 80° C. under reduced pressure to obtain 82 g of a polymer.

In a spectrum of $^{13}$C-NMR measured as a 1,2,4-trichlorobenzene solution, a peak intensity observed at about 43.1 ppm on the basis of tetramethylsilane was 0.85 of the total of the peak intensities at about 42.5-43.1 ppm. The propylene unit was present in a ratio of 8.0% by weight in the polymer. The intrinsic viscosity of the polymer measured at 135° C. as a tetralin solution (hereinafter abbreviated as "η") was 0.40, and a ratio (Mw/Mn) of the weight average molecular weight to the number average molecular weight measured at 135° C. as a 1,2,4-trichlorobenzene solution by using gel permeation chromatography was 2.1.

The obtained copolymer powder was then press-molded at 210° C. to form a sheet having a thickness of 1 mm, and the following physical properties were measured.

Tensile yield strength (kg/cm$^2$): ASTM D638 (23° C.)
Elongation (%): ASTM D638 (23° C.)
Notched Izod impact strength (kg.cm/cm): ASTM D256 (23° C., −10° C.)
Haze (%): ASTM D1003

The tensile yield strength was 4 kg/cm$^2$, the elongation was 500% or more, the Izod impact strength was 80 kg.cm/cm similarly at 23° C. and −10° C., and the haze was 52%.

EXAMPLE 3

The same procedure as in Example 2 was carried out except that 10 g of propylene was replaced with 5 g of ethylene. Afterward, unreacted ethylene was purged, followed by filtration and drying at 80° C. under reduced pressure to obtain 74 g of a polymer. In a spectrum of $^{13}$C-NMR measured as a 1,2,4-trichlorobenzene solution, a peak intensity observed at about 43.1 ppm on the basis of tetramethylsilane was 0.72 of the total of the peak intensities at about 42-44 ppm. The ethylene unit was present in a ratio of 2.6% by weight in the polymer. In addition, η was 0.40, and Mw/Mn was 2.1.

As a result of the measurement of physical properties in the same manner as in Example 2, tensile yield strength was 205 kg/cm$^2$, elongation was 620%, Izod impact strength was 20 kg.cm/cm and 8 kg.cm/cm at 23° C. and −10° C., respectively, and haze was 48%.

EXAMPLE 4

The same procedure as in Example 2 was carried out except that the amount of propylene was 3 g, in order to obtain 76 g of a polymer containing the propylene unit in a ratio of 2.1% by weight. A peak intensity observed at about 43.1 ppm by $^{13}$C-NMR was 0.87 of the total of the peak intensities at about 42-44 ppm, and n was 0.43 and Mw/Mn was 2.1.

As a result of the measurement of physical properties in the same manner as in Example 2, tensile yield strength was 185 kg/cm$^2$, elongation was 480%, Izod impact strength was 25 kg.cm/cm and 6.5 kg.cm/cm at 23° C. and −10° C., respectively, and haze was 46%.

It should be noted that the present invention additionally includes a homopolymer of 4-methylpentene-1 and a copolymer of 4-methylpentene-1 and propylene which will be described hereinafter.

A syndiotactic poly(4-methylpentene-1) in which in a spectrum of $^{13}$C-NMR measured as a 1,2,4-trichlorobenzene solution, a peak intensity observed at about 43.1 ppm on the basis of tetramethylsilane is at least 0.5 of the total of the peak intensities observed at about 42.0-43.5 ppm, and the molecular weight measured by gel permeation chromatography is 1,000 or more.

A copolymer of 4-methylpentene-1 and propylene in which in a spectrum of $^{13}$C-NMR measured as a 1,2,4-trichlorobenzene solution, a peak intensity of the 4- methylpentene-1 unit observed at about 43.1 ppm on the basis of tetramethylsilane is at least 0.5 of the total of the peak intensities of the 4-methylpentene-1 unit observed at about 42.5–43.1 ppm; the content of propylene is from 0.1 to 20% by weight; and the intrinsic viscosity measured at 135° C. as a tetralin solution is at least 0.05.

What is claimed is:

1. A homopolymer of 4-methylpentene-1 having a substantially syndiotactic structure in which in a spectrum of $^{13}$C-NMR measured as a 1,2,4-trichlorobenzene solution, a peak intensity observed at about 43.1 ppm on the basis of tetramethylsilane is at least 0.5 of the total of the peak intensities observed at about 42–44 ppm; the weight average molecular weight measured by gel permeation chromatography is 1,000 or more; and a maximum diffraction line is observed in a spacing of about 9 Å by X-ray diffraction; wherein a crystallization temperature measured by melting said polymer at 300° C. and then dropping its temperature at a rate of 10°/minute is 160° C. or more and wherein a ratio of the weight average molecular weight to the number average molecular weight of the polymer is from 1.5 to 20.

2. A homopolymer according to claim 1 in which in a spectrum of $^{13}$C-NMR measured in the state of a 1,2,4-trichlorobenzene solution, a peak intensity observed at about 43.1 ppm on the basis of tetramethylsilane is at least 0.5 of the total of the peak intensities observed at about 42.0–43.5 ppm.

3. A copolymer of 4-methylpentene-1 and another α-olefin having a substantially syndiotactic structure in which in a spectrum of $^{13}$C-NMR measured as a 1,2,4-trichlorobenzene solution, a peak intensity of the 4-methylpentene-1 unit observed at about 43.1 ppm on the basis of tetramethylsilane is at least 0.3 of the total of the peak intensities of the 4-methylpentene-1 unit observed at about 42–44 ppm; the content of the α-olefin unit other than the 4-methylpentene-1 unit is from 0.1 to 30 mol%; and the intrinsic viscosity measured at 135° C. as a tetrahydronaphthalene solution is 0.05 or more.

4. A copolymer according to claim 3 wherein the α-olefin other than 4-methylpentene-1 is an straight-chain or branched α-olefin having 2 to 25 carbon atoms.

5. A copolymer according to claim 3 wherein a ratio of the weight average molecular weight to the number average molecular weight of the polymer is from 1.5 to 20.

6. A copolymer according to claim 4 wherein the straight-chain α-olefin is ethylene or propylene.

7. A copolymer of 4-methylpentene-1 and propylene in which in a spectrum of $^{13}$C-NMR measured as a 1,2,4-trichlorobenzene solution, a peak intensity of the 4-methylpentene-1 unit observed at about 43.1 ppm on the basis of tetramethylsilane is at least 0.5 of the total of the peak intensities of the 4-methylpentene-1 unit observed at about 42.5–43.1 ppm; the content of propylene is from 0.1 to 20% by weight; and the intrinsic viscosity measured at 135° C. as a tetrahydronaphthalene solution is at least 0.05.

* * * * *

UNITED STATES PATENT AND TRADEMARK OFFICE
CERTIFICATE OF CORRECTION

PATENT NO. : 5,157,092

DATED : October 20, 1992

INVENTOR(S) : Asanuma et al.

It is certified that error appears in the above-identified patent and that said Letters Patent is hereby corrected as shown below:

In column 2, line 29, delete "poly(4-methylpentene-21) and insert therefor --poly(4-methylpentene-1)--.

In column 8, line 9, change "tetrahydronaphthalene" to --1,2,3,4-tetrahydronaphthalene--; and line 28, change "tetrahydronaphthalene" to --1,2,3,4,-tetrahydronaphthalene--.

Signed and Sealed this

Ninth Day of November, 1993

Attest:

BRUCE LEHMAN

Attesting Officer     Commissioner of Patents and Trademarks